Oct. 4, 1960   A. J. RUSCITO ET AL   2,955,235
MOUNTING FOR COMBINED CAPACITOR ARRANGEMENTS
Filed Aug. 27, 1957   2 Sheets-Sheet 1
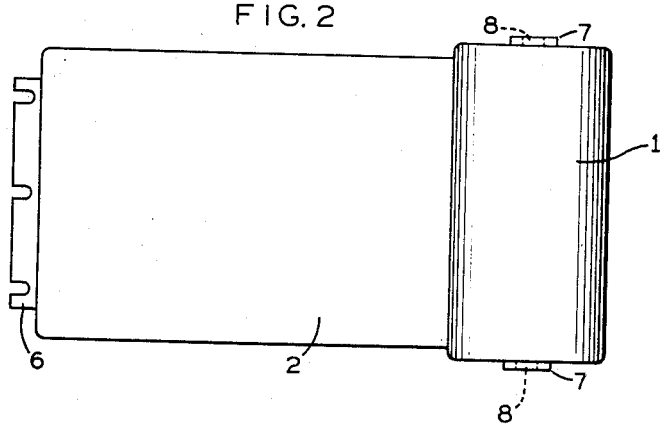
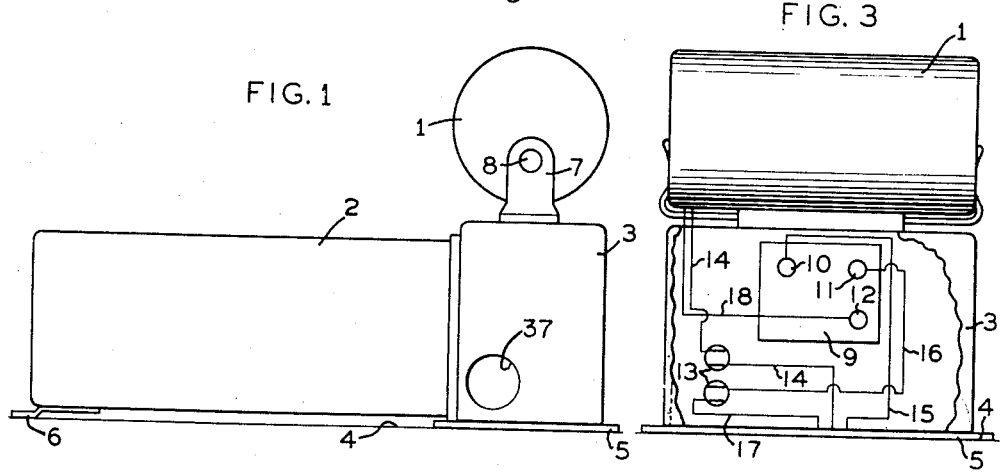
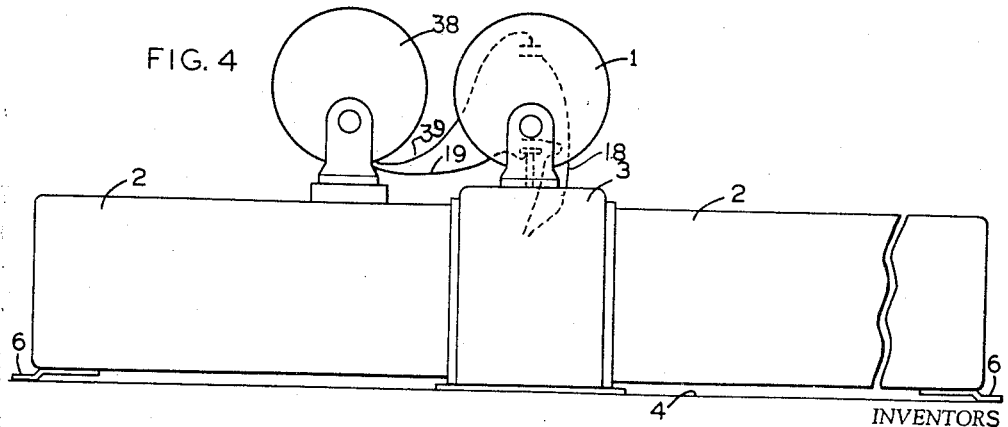
INVENTORS
ANTHONY J. RUSCITO
RAYMOND A. LAMOUREAUX JR
BY *Connolly and Hutz*
THEIR ATTORNEYS Oct. 4, 1960  A. J. RUSCITO ET AL  2,955,235
MOUNTING FOR COMBINED CAPACITOR ARRANGEMENTS
Filed Aug. 27, 1957  2 Sheets-Sheet 2

INVENTORS
Anthony J. Ruscito
Raymond A. Lamoureaux
BY Connolly and Hutz
ATTORNEYS

United States Patent Office 2,955,235
Patented Oct. 4, 1960

2,955,235

MOUNTING FOR COMBINED CAPACITOR ARRANGEMENTS

Anthony J. Ruscito, Williamstown, and Raymond A. Lamoureaux, Jr., North Adams, Mass., assignors to Sprague Electric Company, North Adams, Mass., a corporation of Massachusetts Filed Aug. 27, 1957, Ser. No. 680,600

3 Claims. (Cl. 317—99)

This invention relates to means for mounting two or more capacitors having related functions in a juxtaposed arrangement and more particularly to the mounting of motor-start and motor-run capacitors in air conditioning equipment.

Air conditioning apparatus includes motor capacitors. These capacitors mounted within the air conditioning apparatus are subjected to various conditions during use which may limit their performance and their life. These capacitors are the motor-start capacitor and the motor-run capacitor. The motor-start capacitor is employed for mainly no more than a short moment in the operation of the apparatus. The motor-run capacitor, on the other hand, is operated during the complete operating time. The conditions of operations of the two capacitors is thus different and the demands placed upon the capacitors both in performance and in longevity are different. In addition, both types of capacitors are hampered or injured by moisture and corrosive conditions. Moisture can cause electrical leakage as well as deterioration through oxidation. The effectiveness and life of capacitors is also influenced by the security of the mounting thereof.

It is a valuable feature to provide a capacitor arrangement in which the components employed can be adapted to provide the necessary capacitance characteristics for a variety of circuits. Interchangeability of components in a single arrangement of capacitors can provide this adaptability of capacitor characteristics to circuitry requirements. An additional consideration in capacitor arrangement is their combination with the switching relay.

It is an object of this invention to provide a capacitor assembly in which the capacitors are conveniently and securely mounted for effective operation and long life.

It is another object of this invention to provide a capacitor assembly for air conditioning units having motor-start and motor-run capacitors assembled to provide interchangeability.

A further object of this invention is the provision of an arrangement of motor capacitors for air conditioning equipment allowing for heat dissipation from the capacitors and minimizing corrosive conditions around the capacitors.

Still another object of this invention is the provision of a means and method for mounting a capacitor which protects the capacitor container from corrosion.

These and other objects of this invention will become more apparent upon consideration of the following description taken together with the accompanying drawings in which:

Fig. 1 is a front elevational view of an assembly of capacitors according to this invention;

Fig. 2 is a top plan view of the capacitor arrangement of Fig. 1;

Fig. 3 is a side elevational view of the capacitor arrangement taken from the left as seen in Figs. 1 and 2 partly broken away to show the wiring and components within the housing;

Fig. 4 is a front elevational view of a modification of the capacitor arrangement of Fig. 1;

This invention provides motor-run and motor-start capacitor mountings for assembly in an air conditioning apparatus by means of which the capacitors are securely and effectively mounted in an efficient relationship and protected against deterioration through use.

Figure 5:
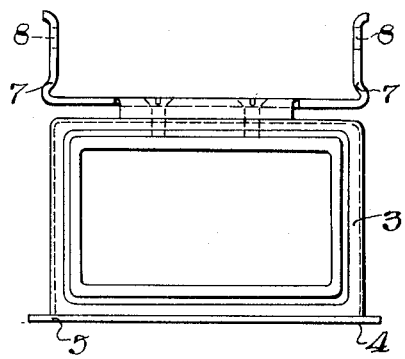
Fig. 5 is a side elevational view of a housing in the capacitor assembly of Fig. 1.

Referring to the figures, Fig. 1 shows a capacitor assembly of a motor-start capacitor 1 and a motor-run capacitor 2 on a housing 3. The housing 3 is secured to a suitable mounting surface 4 by a flange base 5. The motor-run capacitor 2 is supported on the housing 3 and a foot 6 which is also mounted on the surface 4. The motor-start capacitor is mounted in a snap-on bracket 7 positioned on an upper surface of the housing 3. The motor-start capacitor is provided with a pair of button terminals 8 as shown in Fig. 2 which serve to retain the capacitor in the bracket 7. The snap-on bracket 7 for the motor-start capacitor 1 and the can housing the motor-run capacitor 2 and the housing 3 have applied thereto a protective finish in the form of a sprayed-on finish of zinc or aluminum, or a plated-on finish of cadmium, or highly adherent paint. As shown in Fig. 5, the housing 3 is provided with an opening.

Figure 6:
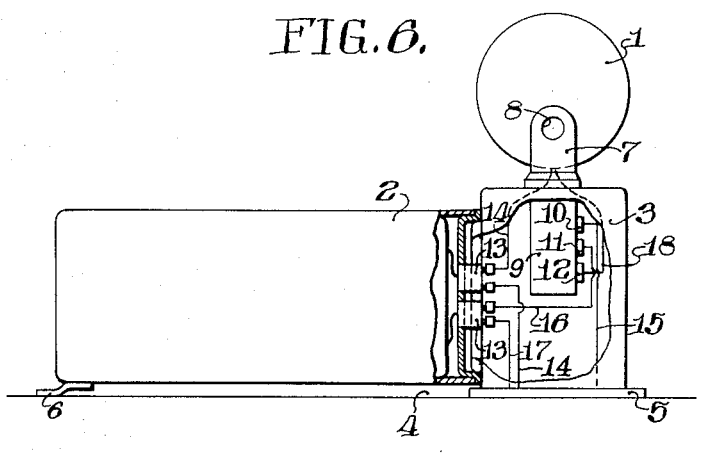
Fig. 6 is a front elevational view of the capacitor assembly of Fig. 1 partially broken away.

As shown in Figs. 3 and 6 the housing 3 contains a relay 9 supported in a suitable relay mounting. The relay 9 is provided with three termnals 10, 11 and 12 to which the connected circuitry is attached. The motor-run capacitor 2 has a pair of terminals 13 which project into the housing 3. Common lead 14 attaches motor-start capacitor 1 to one of the terminals 13 and to a common connection with motor-run capacitor 2. Lead 15 is connected to the terminal 10. Lead 16 connects terminal 11 of the relay with the other of the terminals 13. Lead 17 connects this other terminal with the motor. Lead 18 connects capacitor 1 to terminal 12. Thus, there is provided the circuit connections and the switching for the two capacitors 1 and 2.

The housing 3 as shown in Fig. 1 is provided with a cable hole 37 through which the leads 14, 15 and 17 are passed. In the embodiment of this invention shown in Figs. 1 through 3 the capacitor assembly is shown containing a single set of a motor-run and a motor-start capacitor. The assembly of this invention can be modified to provide additional capacitors. As shown in Fig. 4 the housing 3 is provided with a second motor-run capacitor which is mounted on the housing 3 diametric to the first motor-run capacitor 2. To accommodate this second motor-run capacitor 2 the side wall of the housing 3 is punched out. Further the motor-start electrolytic capacitor is shown mounted on the top of the housing 3. It will be understood that the spring bracket 7 can be positioned on one of the end surfaces and that the motor-start capacitor can be mounted in this position on the housing 3. This second motor-run capacitor 2 is supported in the assembly in the same manner as the first motor-run capacitor 2, having a second foot 6 fastened onto surface 4 to support the end of the capacitor 2 and having connecting circuitry comparable to the connections of the first motor-run capacitor 2 shown in Fig. 3. Similarly, as shown in Fig. 4, an additional motor-start capacitor 38 may be mounted on an upper surface of the capacitor assembly and connected in parallel with the original motor-start capacitor 1. The additional motor-start capacitor 38 is connected to the original motor-start capacitor 1 through a lead 39 and the capacitor 38 is connected into the circuit by a suitable lead 19. The lead 18 is also shown in Fig. 4.

The electrolytic motor-start capacitor cannot operate at the temperature of the electrostatic capacitor 2. In the device of this invention the capacitors are exposed so as to provide heat dissipation both by air convection and by radiation to the ambient atmosphere. This heat dissipation keeps the motor-start capacitor relatively cool and prevents it from being heated up to the temperature of the motor-run capacitor. The elimination of the heating of the motor-start capacitor by the long continuous operation of the motor-run capacitor enhances the life of the motor-start capacitor by two or three times and reduces its heat dissipation requirement. As the capacitors are exposed to circulating currents of air the deposition of condensed moisture in and around the capacitor is minimized and evaporation is assisted.

The relay 9 mounted in the housing 3 and the leads and lines in the housing 3 connecting the components into the air conditioning apparatus circuitry are contained in a compact and safe concentration which provides an economy of space of convenience of access. The plug-in, snap-on means for mounting the capacitors allows for interchangeability of components. Thus, the capacitor assembly of this invention may be readily adapted to various requirements of the apparatus circuitry. The quick connections permitted by this type of structure simplifies the manufacture of the assembly and also the repair and maintenance of the assembly.

It will be understood that this invention is subject to various modifications within the spirit of this invention. The assembly of this invention avoids the enclosure of both capacitors in a structure which causes the heating of the electrolytic motor-start capacitor to above its operating temperature by the continuous running of the motor-run capacitor.

Various advantages of the combination of this invention include the longer life afforded to the components contained in the arrangement. For example, air conditioning equipment may be designed to operate under load so that the units run all the time. Electrolytic capacitors mounted in accordance with this invention have the ability to withstand such use.

It will be understood that the embodiments of this invention are set forth in the description for the purpose of illustration. It is intended that the invention be limited only by the scope of the appended claims.

What is claimed is:
1. In combination a housing forming a chamber, a can containing a capacitor mounted on the outside of and in attachment with said housing at an aperture closed by said capacitor, disconnectable terminals of said capacitor extending into said housing whereby said capacitor is interchangeable, a second capacitor mounted on the outside of said housing on a surface and adjacent to said can, leads from said second capacitor extending into said housing, circuitry within said housing in electrical connection with said terminals and said leads and leads from said circuitry to an electric motor.

2. In a combination of components for controlling an electric motor a housing box, two capacitors mounted on the exterior of said housing box, circuitry contained mainly within said box for connecting said components to an electric motor, a first of said capacitors mounted on said box at an aperture in said box, disconnectable terminals of said capacitor extending into said box and connected with said circuitry, a second capacitor mounted in a spring biased bracket on said housing in close relationship with said circuitry and an electrical component mounted in said box, said circuitry connected to said terminals, said second capacitor, said electrical component and said electric motor.

3. In combination with the combination of components claimed in claim 2 a third capacitor mounted on the outside of the housing and an aperture in a punched-out side wall closed by said capacitor.

References Cited in the file of this patent

UNITED STATES PATENTS

| 2,003,031 | Baker | May 28, 1935 |
| 2,012,417 | Boothby | Aug. 27, 1935 |
| 2,219,495 | Sleeter | Oct. 29, 1940 |
| 2,290,912 | Kielhorn | July 28, 1942 |
| 2,460,903 | Peck | Feb. 8, 1949 |
| 2,488,763 | Charlin | Nov. 22, 1949 |
| 2,529,810 | Moody | Nov. 14, 1950 |
| 2,640,099 | Hull | May 26, 1953 |

FOREIGN PATENTS

| 878,806 | France | Feb. 4, 1943 |
| 634,335 | Great Britain | Mar. 15, 1950 |
| 137,863 | Australia | July 6, 1950 |